United States Patent [19]

Agrawal et al.

[11] Patent Number: 5,196,630
[45] Date of Patent: Mar. 23, 1993

[54] PROCESS FOR THE REMOVAL OF CATALYST RESIDUES FROM OLEFIN POLYMERIZATION PRODUCTS

[75] Inventors: Anil K. Agrawal, Princeton Junction, N.J.; Frederick C. Loveless, Yardley, Pa.

[73] Assignee: Mobil Oil Corporation, Fairfax, Va.

[21] Appl. No.: 693,117

[22] Filed: Apr. 25, 1991

[51] Int. Cl.$^5$ .................... C07C 7/00; C07C 2/08
[52] U.S. Cl. .................... 585/860; 585/525; 585/531; 585/532
[58] Field of Search .............. 585/860, 525, 532, 712; 585/861, 531

[56] References Cited

U.S. PATENT DOCUMENTS

| | | | |
|---|---|---|---|
| 3,904,498 | 9/1975 | Hesse et al. | 204/157.1 |
| 3,992,432 | 11/1976 | Napier et al. | 558/344 |
| 4,028,485 | 6/1977 | Poloso et al. | 528/486 |
| 4,042,564 | 8/1977 | Bennett, Jr. et al. | 528/215 |
| 4,122,126 | 10/1978 | Taniyasu et al. | 585/856 |
| 4,476,297 | 10/1984 | Kablitz et al. | 528/486 |
| 4,547,620 | 10/1985 | Miyata et al. | 585/852 |

*Primary Examiner*—Asok Pal
*Assistant Examiner*—P. Achutamurthy
*Attorney, Agent, or Firm*—Alexander J. McKillop; Malcolm D. Keen; Jessica M. Sinnott

[57] ABSTRACT

The process of the present invention relates to a simplified method for the removal of halogen containing catalytic residues from olefin polymerization products. More specifically, the present invention employs as a treating agent, a quaternary ammonium salt, to facilitate removal of greater than 95% of catalytic residues in a single caustic or water wash with less than 15 minutes of settling time required after the wash.

19 Claims, No Drawings

PROCESS FOR THE REMOVAL OF CATALYST RESIDUES FROM OLEFIN POLYMERIZATION PRODUCTS

BACKGROUND OF THE INVENTION

The present invention relates to a method for removing catalyst residues from olefin polymerization products.

The insufficient removal of catalysts, and in particular, their halogen components, from liquid olefin polymer results in many undesirable problems. For instance, the presence of catalyst residues may cause the discoloration of the resulting polymerization products, the generation of hydrogen halide gas due to the thermal degradation of the catalyst, the degradation or decomposition of the organic compounds due to structural change during subsequent distillation, the poisoning by halogen contaminants of the hydrogenation catalyst during subsequent polymer treatment by halogens which are contained in the polymer as a contaminant, etc. It is therefore desirable to remove the catalyst residues from the polymerization product as fully as possible before the subsequent treatment and/or use of said products.

U.S. Pat. No. 4,476,297 discloses a process for removing catalyst residues from polyolefins prepared with catalysts containing light metal halides and titanium and aluminum compounds. This process comprises suspending the polyolefin in a liquid medium and treating the mixture with an aliphatic monocarboxylic acid and then separating and washing the recovered polyolefin.

U.S. Pat. No. 4,547,620 relates to a process for removing the halogen component from a halogen-containing organic compound produced from a halogen-containing catalyst selected from the group consisting of Friedel-Crafts catalyst and Ziegler catalysts. The process comprises contacting the halogen-containing organic compound with a hydrotalcite compound.

U.S. Pat. No. 4,122,126 discloses a method for removing an aluminum halide or its complex catalyst from a polymerization product prepared by employing said catalyst. The method comprises mixing the polymerization product with an aprotic polar solvent at a temperature of 70° to 150° C. and then filtering the mixture within the same temperature range.

U.S. Pat. No. 3,904,498 relates to a process for removing catalytic residues from reaction products which comprises admixing an aqueous solution of an alkali or alkaline earth metal hydroxide with the reaction product to precipitate the catalyst residues as hydroxides or salts and separating precipitated catalyst residues from the resultant mixture.

U.S. Pat. No. 3,992,432 discloses a process for catalyzing heterogeneous ionic organic reactions in a system of multiple liquid phases. Catalysis is effected by introducing into the system a quaternary ammonium salt.

U.S. Pat. No. 4,028,485 discloses a process for removing hydrogenation catalyst residue from solutions of hydrogenated olefins or olefinic polymers which comprises treating such solutions with non-aqueous acid followed by neutralization with an anhydrous base and filtration.

Thus, the prior art discloses various methods for the removal of catalytic residues from polymerization products. However, since the catalyst residues or their complex compounds are present in the polymerization products in a state near dissolution, it is very difficult to remove catalyst residues completely from the polymerization products with the conventional physical methods.

Other common prior art methods employed for removing halogen-containing catalyst components from olefin polymerization products involve washing with water and/or an aqueous alkaline solution. When water is employed to wash the olefin product, the yield of organic compounds recovered is reduced. This is due mainly to the difficulty encountered when separating the organic compound layer from the water layer. This separation can be accomplished only with poor efficiency. Furthermore, this procedure is labor intensive and requires large and complex facilities for treating the separated water layer. Several difficulties are also encountered when an aqueous alkaline solution is employed for removing catalyst residues. Initially, separation of the oil layer from the aqueous layer can be accomplished with only marginal efficiency resulting in reduced yields of organic product. Additionally, the alkali leads to the formation of a colloidal hydroxide precipitate which requires an additional facility to remove the by-product precipitate. Finally, both washing methods require a significant amount of time. Most current commercial processes employ five aqueous caustic/water washes. Each wash step is followed by as much as 16 hours of settling to effect good oil/water separation.

Accordingly, it is an object of the present invention to provide a process for the removal of catalyst residues from liquid olefin polymerization products.

Another object of this invention is to provide a process for removing catalyst residues from reaction products prepared with Friedel-Crafts type catalysts and other Lewis acids or Ziegler-type catalysts.

A further object of this invention is to provide a method for removing catalyst residues from liquid olefin polymerization products which minimizes the time and process steps required to separate such residues from the reaction product.

Another object of this invention is to provide a process for purifying liquid olefin polymerization products from discoloring residues.

Upon further study of the specification and appended claims, further objects and advantages will become apparent to those skilled in the art.

SUMMARY OF THE INVENTION

The present invention provides a process for the removal of catalyst residues, particularly Friedel-Crafts catalytic residues such as $AlCl_3$ and $BF_3$ from liquid olefin polymerization products by the use of a quaternary ammonium salt as a treating agent. The current invention removes greater than 95% $AlCl_3$ (expressed as acid value) in a single caustic wash and less than about 15 minutes of settling after the wash.

More particularly this invention relates to a process for the removal of halogen-containing catalytic residues from olefin polymerization products comprising:

(a) admixing an olefin polymerization product with a quantity of a quaternary ammonium salt effective to facilitate the removal of greater than 80% of contaminating halogen-containing catalytic residues upon subsequent washing with aqueous solution and separation of the aqueous phase;

(b) washing the mixture of step (a) with an aqueous washing solution;

(c) allowing the washed solution of step (b) to settle for a time effective to cause the aqueous and organic phases to separate; and (d) separating the aqueous phase from the organic phase to provide an organic phase that is substantially free of contaminating catalytic residues.

DETAILED DESCRIPTION OF THE INVENTION

It has now been found that it is possible to remove catalyst residues from organic solutions of reaction products in a relatively simple process which saves both time and energy. More specifically, the process of the present invention is a simplified method for the removal of catalyst residues, and in particular, $AlCl_3$ and $BF_3$ residues from liquid olefin polymerization products.

Currently, $AlCl_3$ is one of the most popular catalysts for commercially producing olefin polymers (e.g., polydecene-1). The $AlCl_3$ catalyst residue which remains in the polymer reaction product is commonly removed commercially by a series of as many as five aqueous caustic or water washes. Each wash step is followed by as much as 16 hours of settling to effect good oil/water separation. The present invention employs a quaternary ammonium salt to facilitate removal of greater than 95% $AlCl_3$ (expressed as acid value) in a single caustic wash with about 20 minutes of settling time required after the wash to effect the required phase separation. Without the use of the quaternary ammonium salt, only about 50% $AlCl_3$ removal takes place in a single wash/separation step.

The invention thus relates to a process for removing halogen-containing catalyst residues from polyolefin reaction products by treating the polyolefin with a quaternary ammonium salt to form a mixture; contacting or washing said mixture with a quantity of an aqueous washing solution such as an aqueous caustic solution or deionized water; allowing the organic and aqueous phases time to settle and separate; and, drawing off the aqueous phase to leave the remaining organic phase which is substantially free of contaminating catalytic residues. Typically, up to about 50 weight % of aqueous caustic and/or 10 to 500 weight % of deionized water is employed in the aqueous washing step of the present invention.

The term "washing" as generally employed herein involves contacting the organic mixture containing the unwanted impurities with an immiscible solvent, such as water, to dissolve the unwanted impurities in the aqueous or second phase. The aqueous or second phase can contain an acid or a base to facilitate the removal of the unwanted impurities depending on their chemical nature.

The process according to the invention is suitable for all solution homopolymers and copolymers of ethylene, propylene and higher 1-olefins and is functional in removing a variety of catalyst residues, dienes and vinyl aromatics from olefin polymerization products including, but not limited to, Friedel-Crafts type catalysts such as $AlCl_3$, $BF_3$, $FeCl_3$ and $SnCl_4$ and Lewis acids, or Ziegler-type catalysts formed by combinations of organo metallic compounds such as aluminum, magnesium and lithium with transition metal salts such as halides and esters of titanium, vanadium, zirconium, cobalt, nickel, and the like. The process is preferably carried out in a liquid medium directly after the polymerization of the olefin.

The treatment of the liquid olefin is carried out at a temperature of from about 40° C. to about 150° C., preferably from about 50° C. to 85° C. The quantity of the quaternary ammonium salt treating agent to be employed is typically based on total polymer and the acidity of the polymer. Generally, the greater the acidity of the polymer, the more quaternary ammonium salt treating agent is needed. Typically, the amount of treating agent is within the range of about 0.01 to about 3.0 weight percent relative to polymer solution.

Quaternary ammonium salts suitable as treating agents generally fall within the formula

$$R_4N^+X^-$$

wherein R=alkyl, aralkyl or alkaryl, and

X=F, Cl, Br, I, sulfate, nitrate or any other common anion such that the quaternary ammonium treating agent is soluble in the organic phase. The sum of carbons in the four R groups is typically between about 16 and 80.

Preferable quaternary ammonium salts suitable as treating agents include, but are not limited to, tricaprylylmethyl ammonium chloride (ALIQUAT 336), tetraethyl ammonium chloride, tetrapentyl ammonium chloride, dicoco dimethyl ammonium chloride (VARIQUAT K300), dialkyl $C_{12}$-$C_{18}$ dimethyl ammonium chloride (ANDOGEN 432) and ditallow dimethyl ammonium chloride (ANDOGEN 470).

The process can be carried out discontinuously or continuously. In a continuous operation, it is advantageous that the treating agent acts on the polymer in a countercurrent fashion.

The present process is carried out in the liquid phase and takes place in the following stages:

1. 0.01-3.0 weight %, based on polymer to be treated, of a quaternary ammonium salt treating agent is mixed with a quantity of a liquid olefin polymerization product containing contaminating catalyst residues.

2. The mixture of step 1 is washed with an aqueous washing solution, preferably with agitation for up to about 20 minutes. Deionized water and/or aqueous caustic can be employed as the aqueous washing solution.

3. The two liquid phases, organic and aqueous, are then allowed sufficient time to settle and for phase separation to take place. The aqueous or water phase is then drawn off, leaving the organic product phase which is substantially free of contaminating catalyst residues.

Washing and settling times vary depending on the polymer to be treated and the quantity of catalyst residue present. Specific washing and settling times necessary for a particular situation can be readily determined by one having ordinary skill in the art without an undue amount of experimentation.

Without further explanation, it is believed that one skilled in the art can, using the preceding description, utilize the present invention to its fullest extent. The following examples are construed as merely illustrative, and not intended to limit the disclosure.

EXAMPLE 1

To demonstrate the efficiency of the process of the present invention two samples of polydecene-1 containing $AlCl_3$ catalytic residues were treated with 0.1 and 0.3 wt % respectively of the quaternary ammonium salt, tricaprylylmethyl ammonium chloride. A third sample served as a control. Each of the three samples, 450 cc each, were then washed with 450 cc of 5.0 wt. % aqueous caustic in a mixer for three minutes. The organic and aqueous phases of each sample were then allowed to settle for 15 minutes and the aqueous phase was removed and discarded. The following table illustrates the results of the treatments:

| Wt. % Quaternary salt used | Acid Values Before wash | After wash | % AlCl₃ removed |
|---|---|---|---|
| 0.1 | 9.9 | 0.3 | 98 |
| 0.3 | 34.7 | 0.4 | 99 |
| 0.0 | 28.1 | 13.9 | 51 |

As clearly seen, when no quaternary ammonium salt was employed, only 51% of AlCl₃ was removed by the caustic washing. When however, the polydecene-1 was treated with a quaternary ammonium salt prior to the caustic wash step, at least 98% of AlCl₃ was removed.

EXAMPLE 2

This example was carried out in the same manner as Example 1. 0.3 wt. % of the quaternary salt, Aliquat 336, (tricaprylylmethyl ammonium chloride) was added to a polydecene-1 product containing AlCl₃ catalyst residues. However, deionized water was employed in the washing step in place of the aqueous alkaline solution employed in Example I. 98% of the AlCl₃ catalyst was removed in a single washing step. The following table illustrates the results.

| Wt. % Quaternary salt used | Acid Values Before wash | After wash | % AlCl₃ removed |
|---|---|---|---|
| 0.3 | 24.6 | 0.4 | 98 |

The results are similar to those of Example 1.

EXAMPLE 3

Example 3 was carried out in the same manner as Example 1, the only difference being that the polydecene-1 had been prepared with boron trifluoride (BF₃) as the catalyst. The following table illustrates the use of 0.05 wt % of Aliquat 336 (tricaprylylmethyl ammonium chloride) in removing BF₃ from the polydecene-1.

| Wt. % Quaternary salt used | Acid Values Before wash | After wash | % BF₃ removed |
|---|---|---|---|
| 0.0 | 4.1 | 2.4 | 42 |
| 0.05 | 4.3 | 0.3 | 93 |

This example shows that only 42% of the BF₃ was removed by caustic washing alone while the treatment of the polymer with a quaternary ammonium salt prior to the caustic washing resulted in a removal of 93% of the BF₃ residue.

From the foregoing description and examples, one skilled in the art can easily ascertain the essential characteristics, and without departing from the spirit and scope thereof, can make various changes and modifications of the invention to adapt it to various usages and conditions.

What is claimed is:

1. A process for the removal of halogen-containing catalytic residues from olefin polymerization products comprising:

(a) admixing an olefin polymerization product with a quantity of a quaternary ammonium salt, having the structural formula $$R_4N^+X^-$$

wherein R is alkyl, aralkyl or alkaryl and X is a halogen selected from the group consisting of fluorine, chlorine, bromine and iodine, effective to facilitate the removal of greater than 80% of contaminating halogen-containing Friedel-Crafts type or Ziegler-type catalytic residues upon subsequent washing with aqueous solution and separation of the aqueous phase;

(b) washing the mixture of step (a) with an aqueous washing solution;

(c) allowing the washed solution of step (b) to settle for a period of time effective to cause the aqueous and organic phases to separate; and (d) separating the aqueous phase from the orgainic phase to provide an organic phase that is substantially free of contaminating catalytic residues.

2. The process of claim 1 wherein 0.01 to 3.0 weight percent, based on polymer, of a quaternary ammonium salt is added in step (a).

3. The process of claim 1 wherein said aqueous washing solution is an aqueous alkaline solution or deionized water.

4. The process of claim 1 wherein said washing of step (b) is performed at a temperature of from about 20° C. to about 150° C.

5. The process of claim 1 wherein said washing of step (b) is performed at a temperature of from about 30° C. to about 70° C.

6. The process of claim 1 wherein the washing of step (b) is conducted for up to about 20 minutes.

7. The process of claim 3 wherein said aqueous washing solution is an aqueous caustic solution.

8. The process of claim 7 wherein up to about 50.0 weight percent of an aqueous caustic is employed in the washing step.

9. The process according to claim 3 wherein 10–500 weight percent, based on polymer, of deionized water is employed as the washing solution.

10. The process according to claim 1 wherein the quaternary ammonium salt is tricaprylylmethyl ammonium chloride, tetralkyl ammonium chloride, tetrapentyl ammonium chloride, dicoco dimethyl ammonium chloride, dialkyl dimethyl ammonium chloride or ditallow dimethyl ammonium chloride.

11. The process according to claim 1 wherein the Friedel-Crafts type catalyst is AlCl₃ or BF₃.

12. A process for the removal of halogen-containing Friedel-Crafts type or Ziegler-type catalytic residues from olefin polymerization products comprising:

(a) admixing the olefin polymerization product with 0.01 to 3.0 weight percent, based on olefin, of tricaprylylmethyl ammonium chloride.

(b) washing the mixture of step (a) with an aqueous washing solution for up to about 20 minutes;

(c) allowing the aqueous and organic phases to settle for less than about 15 minutes; and (d) separating the aqueous phase from the organic phase to provide an organic product phase which is substantially free of contaminating catalyst residues.

13. The process of claim 1 in which the sum of carbon atoms in the four groups designated by R range from about 16 to 80.

14. A process for the removal of halogen-containing catalytic residues from olefin polymerization products comprising:
(a) admixing an olefin polymerization product with a catalyst residue remover consisting essentially of a quaternary ammonium salt, having the structural formula $R_4N^+X^-$ wherein R is alkyl, aralkyl or alkaryl and X is a halogen selected from the group consisting of fluorine, chlorine, bromine and iodine, effective to facilitate the removal of greater than 80% of contaminating halogen-containing Friedel-Crafts type or Ziegler-type catalytic residues upon subsequent washing with aqueous solution and separation of the aqueous phase;
(b) washing the mixture of step (a) with an aqueous washing solution;
(c) allowing the washed solution of step (b) to settle for a period of time effective to cause the aqueous and orgainic phases to separate; and
(d) separating the aqueous phase from the organic phase to provide an organic phase that is substantially free of contaminating catalytic residues.

15. The process of claim 14 in which the treating step is carried out at a temperature ranging from about 40° C. to about 150° C.

16. The process of claim 14 in which the olefin polymerization products are derived from 1-olefins comprising 1-decene.

17. The process of claim 14 in which the catalyst is $AlCl_3$ or $BF_3$.

18. The process of claim 14 in which the quaternary ammonium salt is tricaprylylmethyl ammonium chloride.

19. The process of claim 18 in which the quaternary ammonium salt is used in an amount ranging from 0.01 to 3.0 weight percent based on the 1-olefin.

* * * * *